(12) United States Patent
Janze et al.

(10) Patent No.: US 9,690,170 B2
(45) Date of Patent: Jun. 27, 2017

(54) CAMERA DOLLY AND RECORDING SYSTEM

(71) Applicant: BLACKCAM 4D GmbH, Berlin (DE)

(72) Inventors: Thomas Janze, Berlin (DE); Jan Karabasz, Berlin (DE)

(73) Assignee: Blackcam 4D GmbH, Berlin (DE)

(*) Notice: Subject to any disclaimer, the term of this patent is extended or adjusted under 35 U.S.C. 154(b) by 0 days.

(21) Appl. No.: 14/649,795

(22) PCT Filed: Nov. 13, 2013

(86) PCT No.: PCT/EP2013/073726
§ 371 (c)(1),
(2) Date: Jun. 4, 2015

(87) PCT Pub. No.: WO2014/086563
PCT Pub. Date: Jun. 12, 2014

(65) Prior Publication Data
US 2015/0309394 A1 Oct. 29, 2015

(30) Foreign Application Priority Data
Dec. 7, 2012 (DE) .................. 10 2012 111 974

(51) Int. Cl.
*G03B 17/56* (2006.01)
*H04N 5/225* (2006.01)
(Continued)

(52) U.S. Cl.
CPC ........... *G03B 17/561* (2013.01); *F16M 11/18* (2013.01); *F16M 11/425* (2013.01);
(Continued)

(58) Field of Classification Search
None
See application file for complete search history.

(56) References Cited

U.S. PATENT DOCUMENTS

| 4,699,484 A * | 10/1987 | Howell ............... F16M 11/10 352/132 |
| 6,775,475 B1 * | 8/2004 | Traver ............... G03B 15/00 352/243 |

(Continued)

FOREIGN PATENT DOCUMENTS

| DE | 20 2008 012 368 | 12/2008 |
| EP | 0 384 020 | 8/1990 |

(Continued)

OTHER PUBLICATIONS

RigWheels dolly_slider system for DSLR filmmakers; Online Resource; publication date Aug. 7, 2011; http://www.gizmag.com/rigwheels-dslr-dolly-slider-cheap/18350/.*

(Continued)

*Primary Examiner* — Shahbaz Nazrul
(74) *Attorney, Agent, or Firm* — Dicke, Billig & Czaja, PLLC

(57) ABSTRACT

A remote-controllable camera dolly and a system for television, film or video recording, including a camera dolly is disclosed. The remote-controllable camera dolly comprises a planar first main part, at least four first wheels that are connected to the first main part and whose rotational axes are each arranged parallel to one another, at least four second wheels that are connected to the first main part and whose rotational axes are each arranged in a first plane that is substantially orthogonal to the rotational axes of said at least four first wheels such that the camera dolly can be moved, guided along a guide element, by means of said at least four first wheels and at least four second wheels, as well as a motorized camera holder which is detachably connected to the fast main part and can be pivoted an at least two axes.

17 Claims, 3 Drawing Sheets

(51) Int. Cl.
 H04N 5/232 (2006.01)
 H04N 5/28 (2006.01)
 F16M 11/18 (2006.01)
 F16M 11/42 (2006.01)
(52) U.S. Cl.
 CPC ....... H04N 5/2251 (2013.01); H04N 5/23203 (2013.01); H04N 5/28 (2013.01)

(56) References Cited

U.S. PATENT DOCUMENTS

| | | | | |
|---|---|---|---|---|
| 7,637,125 | B2* | 12/2009 | Nakanishi | C03B 23/043 65/271 |
| D622,754 | S* | 8/2010 | Hernandez | F16M 11/42 D16/242 |
| 8,205,841 | B2* | 6/2012 | Wood | B66F 11/048 16/45 |
| 8,721,199 | B1* | 5/2014 | Hart | F16M 11/045 396/428 |
| 9,154,673 | B2* | 10/2015 | Stone | H04N 5/2251 |
| 2005/0231689 | A1* | 10/2005 | Longley | F16M 11/42 352/243 |
| 2005/0275720 | A1* | 12/2005 | Noguchi | G08B 13/19623 348/152 |
| 2007/0070069 | A1* | 3/2007 | Samarasekera | G06F 3/011 345/427 |
| 2008/0257199 | A1 | 10/2008 | Jackson | |
| 2008/0315543 | A1 | 12/2008 | Fisher | |
| 2010/0008661 | A1* | 1/2010 | Wood | F16M 11/42 396/428 |
| 2012/0037575 | A1 | 2/2012 | Wen | |
| 2015/0156378 | A1* | 6/2015 | Wood | H04N 5/2251 348/373 |

FOREIGN PATENT DOCUMENTS

| | | |
|---|---|---|
| WO | 87/03104 | 5/1987 |
| WO | 92/22172 | 12/1992 |
| WO | 96/10511 | 4/1996 |
| WO | 2006/042522 | 4/2006 |

OTHER PUBLICATIONS

Kickstarter_REVOLVE—The Versatile, Portable and Affordable Camera Dolly—YouTube (Publication date Apr. 19, 2012, https://www.youtube.com/watch?v=fw-TGMuaqR0).*

DIY Camera Slider (Trolley Dolly)—YouTube (Publication date Aug 2, 2011, https://www.youtube.com/watch?v=bnjif5KDjSI ).*

* cited by examiner

CAMERA DOLLY AND RECORDING SYSTEM

CROSS REFERENCE TO RELATED APPLICATION

This Utility Patent Application claims priority under 35 U.S.C. §371 to International Application Serial No. PCT/EP2013/073726, filed Nov. 13, 2013, which claims the benefit of German Patent Application No. DE 10 2012 111 974.0, filed Dec. 7, 2012; which are both incorporated herein by reference.

BACKGROUND

The present invention relates to a remote-controllable camera dolly and a system for television, film or video recording including the remote-controllable camera dolly.

During the production of telecasts, films, video recordings or live broadcasts, it is often desirable to maneuver one or even several cameras between different recording positions. The camera movements required for this purpose can include a change in the height of the respective camera, a lateral and longitudinal movement between the camera and a recorded object, as well as an alteration of the camera orientation relative to the recorded object. In addition, it is often desirable for the moving camera to also be able to make recordings of an action or a scene. Such a camera movement can involve the use of mobile camera dollies with a corresponding camera holder, which ensures a stable enough platform for the camera both when at rest and moving, making it possible to avoid any blurred images in the recording.

The currently used mobile camera dollies or systems are very large, and thus can hardly be used on a stage. The size and height can also pose a problem in front of the stage, since they partially restrict valuable audience space and a clear view, which organizers and audiences of concerts and shows find undesirable. In addition, these systems are often very expensive.

In view of the aforesaid, the present invention proposes a remote-controllable camera dolly according to claim 1, a remote-controllable system for television recordings, film recordings or video recordings according to claim 12, and a studio- or stage-system according to claim 20.

BRIEF DESCRIPTION OF THE DRAWINGS

Shown therein in.

DETAILED DESCRIPTION

Figure 1A:
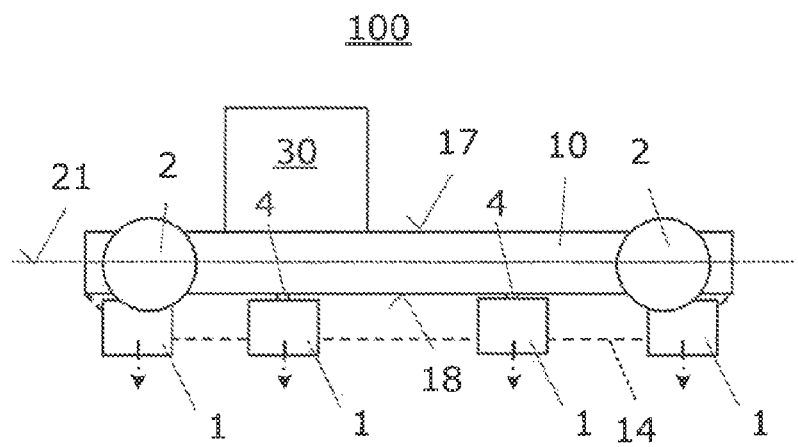
FIG. 1A is a side view of a remote-controllable camera dolly according to an embodiment.

According to an embodiment a remote-controllable camera dolly is provided. The camera dolly comprises a flat first main body, at least four first wheels, which are connected with the first main body, and whose respective rotational axes are each arranged parallel to one another, and at least four second wheels, which are connected with the first main body, and whose rotational axes are each arranged in a first plane that is substantially orthogonal to the rotational axes of the at least four first wheels, such that the camera dolly can be moved and guided along a guide element, by means of the at least four first wheels and the at least four second wheels. In addition, the camera dolly comprises a motorized camera holder, which is detachably connected with the first main body, and can be pivoted in at least two axes. The guide element is typically formed by a rail system with at least one two-rail track having two rails spaced a track width apart from one another, typically with a substantially rectangular cross section, wherein the camera dolly can be placed onto the rail system in such a way that the interior sides of the two rails are contacted by at least two of the respective at least four first wheels, and that the upper sides of the first rail and upper side of the second rail are contacted by at least two of the respective at least four second wheels. Typically, the four first wheels are arranged under the first plane and/or the four first wheels are, in a direction of a rotational axis of at least one of the four second wheels, arranged between at least two of the four second wheels. As a result of this structural design, the at least four first wheels can serve as guide wheels, while the at least four second wheels bear the weight of the camera dolly. This enables a secure, slip-resistant and sufficiently low-vibration movement of the camera dolly on the rail system, in particular when the at least four first wheels and/or the at least four second wheels are designed as plane rollers or castors, which increases the contact surface on the rail system.

In order to further improve the smoothness of the camera dolly, the at least four second wheels are typically mounted using a vibration reducing mounting, either individually or in pairs via a common carrying axle.

In addition, the tires put on the at least four first wheels and/or the at least four second wheels typically consist of an elastic material, e.g., a PUR plastic, which also makes it possible to further increase the smoothness of the camera dolly.

The at least four first wheels are typically resiliently mounted in a direction orthogonal to their respective rotational axis. As a result, the camera dolly can be resiliently mounted, guided between the interior sides of the two rails, so that the smoothness and lateral stability of the camera dolly can be further improved.

In this way, the requirements placed on the smoothness and stability of the camera dolly in the recording process can be significantly increased by comparison to video monitoring systems, thereby satisfying the corresponding criteria of the film and television industry.

In addition, the camera dolly can be given a space-saving and compact design. The volume of the first main body is typically less than about 2 liters, even more typically less than about 1 liter. In particular, the distance between the upper side and opposing lower side of the camera dolly can measure only about 7 cm, or be even less. As a result of the smaller overall height of the camera dolly, the camera dolly no longer optically interferes with the show or recording, or at least does so only to a minimal extent. In addition, the compact design of the camera dolly also makes it possible to reliably and quietly guide the camera dolly around relatively tight curves.

This significantly expands the possible applications of the camera dolly or a recording system that includes one or more camera dollies and a correspondingly dimensioned rail system. In addition, the costs can be lowered.

At concerts, performances and shows, in particular in large arenas, staging increasingly also includes transmitting the actions on stage to readily visible projection screens. Only in this way viewers can participate equally and expensive admission tickets are justified. In like manner, numerous, even smaller concerts for TV broadcasts and sale on DVD's are recorded in parallel with cameras. Music and stage groups are increasingly allowing their respective next, new performance to be copied for DVD, Blu-ray, online and/or TV purposes. However, the fully or partially automated camera systems previously used for this purpose are very large, and can thus not be used on stage. In addition, sensitive artists might become disturbed on stage by large-scale recording technology or camera personnel. In turn, the previously used systems often obstruct the view in front of the stage given their size and height. In addition, they take up a relatively large amount of space, often forcing the organizer to sell fewer admission tickets or, in the worst case scenario, move viewers who have already arrived on scene to worse seats, since an order for a recording is in practice only placed once it has become clear that the respective arena has sold out. Furthermore, there is a very high risk that the cables lying around in what is most often a darkened atmosphere will pose tripping hazards, thereby potentially leading to technical malfunctions.

All of these problems can be at least significantly reduced by using the low-volume camera dolly of this document. Since they require less space and restrict the view to a significantly lesser extent, the cameras on and/or in front of the stage can be used by remote control. As a result, the quality requirements of the production company and/or audience on the display screen (TV, DVD) can be better harmonized with the needs of the organizer and/or live audience, thereby largely avoiding conflicts of interest. In addition, this makes it possible to record dynamic images from the moving camera dolly. Finally, the small camera dollies are less expensive to manufacture and transport on the one hand, and the corresponding recording systems are typically easier to assemble and disassemble on the other.

The visible surfaces of the first main body and the camera holder are typically blackened, and both the at least four first wheels and the at least four second wheels are provided with tires consisting of black, elastic material. For example, the first main body can be made out of correspondingly anodized aluminum. This makes the camera dolly even less optically visible during the show or recording. Undesired light flares can also be largely avoided in this way.

In a further development, the camera holder can be fastened to the upper side and/or lower side of the first main body. This makes it easy to exchange the camera holder which is typically tailored to at least one special camera or to exchange a system comprised of the camera(s) and camera holder ("remote head").

The camera mount can be set up to accommodate one camera or two cameras, or be designed as a corresponding "remote head". Using two cameras makes it possible to record 3D films or 3D videos. The two cameras can here be arranged relative to each other in either a parallel manner ("side-by-side") or orthogonally by means of mirror setups ("mirrored").

For example, the first main body may include several corresponding mounting holes, to which the camera holder can be fastened, e.g., bolted. The mounting holes may be arranged in a grid and/or have varying diameters, thereby enhancing flexibility. Other additional modules can also be fastened to the first main body via the mounting holes. However, the first main body may also include replaceable plates or sections, with which the camera holder can be joined with the first main body.

The camera holder can typically be mounted both on the lower side and on the upper side. This allows the camera dolly to move both with the camera guided above the two-rail track, e.g., in proximity to the floor or slightly elevated, as well as with the camera guided under the track (overhead), e.g., in proximity to a ceiling. For example, several camera dollies can be used on corresponding two-rail tracks at different heights, thereby enabling a wide range of image perspectives.

In a further development, the first main body incorporates an electric motor, e.g., a brushless direct voltage motor, for driving at least one of the at least four second wheels. Alternatively or additionally, the electric motor can also be used for driving at least one of the at least four first wheels.

The electric motor is typically supplied by a power source arranged in the first main body, e.g., by a battery or battery pack, which can also supply the camera mount as well as the camera and additional modules.

The electric motor can be connected with the at least one of the at least four second wheels by means of a reduction gear arranged in the first main body. As a result, a sufficiently large torque for driving the camera dolly can be provided even by low-torque electric motors, so that the camera dolly can quickly change its position, and in this process may even take along any supply and/or data cables that might be present. A reduction gear can also be entirely eliminated when using an electric motor with a high torque.

The inventors surprisingly discovered that the camera dolly can be moved on the two-rail track with a high reproducibility and smoothness using just a single driven second wheel. In these embodiments, a planetary gear can be placed between the electric motor and driven second wheel instead of the otherwise typically used differential gear, or the reduction gear can be completely eliminated if the used electric motor provides a sufficiently high torque. This allows the camera dolly to have an especially simple and low-volume construction.

The camera dolly is typically constructed so as to have the lowest possible center of gravity, i.e., one lying under the at least four second wheels. To this end, a weight plate arranged under the first plane or even under the at least four second wheels can be provided in the first main body. Alternatively or additionally, a weight plate can be arranged on the upper side of the first main body.

In a further development, the camera dolly includes a connection for a supply cable for supplying power to the electric motor, the camera holder, the camera and/or additional modules, and/or for transmitting video and audio signals of the camera, control data and/or position data. The connection, e.g., one or more plug-in connectors, for the supply cable is typically located at a side of the first main body, e.g., between two of the four second wheels, so that the camera dolly can drag along the supply cable to the side next to the two-rail track. However, the connection can also be located on the upper side of the first main body.

The supply cable is typically a data cable for transmitting video and/or audio signals of the camera, which are also referred to below as video signals, control data and/or position data. The control data typically include control data for the camera holder and camera and/or control data for the camera dolly, e.g., control data for the electric motor or instruction to a motor controller, so that the camera dolly moves toward a new position on the two-rail track and/or moves on the two-rail track at a specific speed or in accordance with a timed speed profile. The position data can include positions to be approached by the camera dolly and transmitted to the camera dolly and/or current positions of the camera dolly determined by the camera dolly and sent by the camera dolly. The camera dolly can have a sensor and/or a transmitter in order to determine its current position. For example, a laser, radio or ultrasound-based positioning system can be used. Additionally or alternatively, however, motor data, e.g., the speed, can also be used for positioning.

Alternatively or additionally, the camera dolly may include a wireless transmission system for the video and/or audio signals of the camera, the control data and/or the position data.

According to yet another further development, the camera dolly includes a flat second main body that is pivotably joined with the first main body, at least four additional first wheels that are joined with the second main body and whose respective rotational axes are arranged parallel to one another, and at least four additional second wheels that are joined with the second main body and whose respective rotational axes are arranged in a plane substantially orthogonal to the rotational axes of the at least four additional first wheels.

However, the first main body can also consist of two or more flat partial bodies that can be pivoted relative to one another in the first plane, wherein at least two first wheels and at least two second wheels are joined with each of the at least two flat partial bodies.

This enables a two- or multi-part construction of the camera dolly, typically consisting of similarly designed camera dolly sections. As a result, versatility can be increased, and the camera dolly can be built especially small, and also be guided around very tight curves. In a joined state, the second main body or a second partial body typically projects partially into the first main body or into a first partial body when the second main body and the first main body are joined together. In addition, it is typical for the second main body or the second partial body to be connectable or connected during operation with the first main body or the first partial body by means of a short supply cable for supplying power and/or transmitting video signals, control data and/or position data. As a result, the modules or functional units can be split up among two or more camera dolly sections. In this way, only one of the main bodies or partial bodies may have an electric motor. Another embodiment involves the use of two or more synchronized electric motors, which can be located in different main bodies.

An exemplary embodiment provides a system for television recordings, film recordings or video recordings. The system includes at least one camera dolly and a rail system with a first rail and a second rail, which are spaced a track width apart from one another, wherein the first rail and the second rail each have an upper side and interior side, which each are substantially straight in a cross section. The camera dolly includes a flat first main body, at least four first wheels that are joined with the first main body and whose respective rotational axes are arranged parallel to one another, and at least four second wheels that are joined with the first main body and whose respective rotational axes are arranged in a first plane that is substantially orthogonal to the rotational axes of the at least four first wheels, wherein the camera dolly can be placed onto the rails in such a way that the interior sides of the first rail and the second rail are contacted by respective at least two of the at least four first wheels, and that the upper side of the first rail and the upper side of the second rail are contacted by respective at least two of the at least four second wheels. In addition, the camera dolly comprises a motorized camera holder that can be detachably joined with the first main body and pivoted in at least two axes.

The first rail and second rail are typically sections, e.g., steel or aluminum sections, with a substantially rectangular cross section. The latter are cost-effective on the one hand, and make it possible to stably guide the at least one camera dolly on the other. The first rail and second rail are typically blackened, e.g., correspondingly anodized, so that the rail system also does not noticeably disrupt either the recording process or the live audience, and undesired light flares can be largely avoided.

Given the typical small size of the at least one camera dolly, the track width between the two rails is typically less than 20 cm, and even more typically less than 15 cm.

In order to ensure the highest possible stability, the center of gravity of the at least one camera dolly typically lies under the upper side of the first rail and the upper side of the second rail when the at least one camera dolly is arranged on the rail system. In addition, the first main body typically extends up to at most 7 cm over the upper side of the first rail and the upper side of the second rail when the at least one camera dolly is arranged on the rail system.

In a further development, the system includes at least one camera that can be held by the camera holder and has a volume without an optional optical attachment of at most about 0.25 liters. The camera is typically designed with the capacity to deliver video signals with a data rate of more than 100 Mbit/s, typically of more than 1 GBit/s. This enables high-resolution recordings, typically at least in full-HD resolution (full high definition, i.e., 1920×1080 pixel image resolution at 50 Hz or 60 Hz). For example, this can be a ⅔" camera manufactured by IndieCam. However, the camera can also be a mobile phone with a high-resolution camera, such as a Nokia 808 PureView with a 41 megapixel camera. Using a mobile phone with a high-resolution camera would make it possible to provide high-performance, very cost-effective recording systems, potentially even without the need for any supply cables, since modern mobile phones can be remotely activated and deliver video data, and also have enough computing power to handle control tasks for the camera dolly.

In yet another further development, the system for television, film or video recordings includes a positioning system for determining a position of the at least one camera dolly. This may be a laser-based, infrared-based or ultrasound-based positioning system.

In yet another further development, the system includes a console for controlling the position of the at least one camera dolly, an orientation of the camera holder and/or a camera setting, a control computer for controlling the position of the at least one camera dolly, an orientation of the camera holder and/or a camera setting, and/or a monitor for displaying at least one camera image. In particular for multiple, repeat performances, the control computer can also be fully automated to take over control of the camera dolly and cameras, so that the director or stage manager only has to intervene in the case of malfunctions or unforeseen events.

According to an embodiment a studio- or stage-system is provided. The studio or stage-system includes a floor with a slit and/or a ceiling with a slit, as well as a system for television, film or video recordings including at least one camera dolly and a rail system having a first rail and a second rail for the at least one camera dolly, such that the camera holder extends at least partially through the respective slit if the at least one camera dolly is placed on the rail system.

In this way, the rail system is not visible from the stage and auditorium, with at most just parts of the camera holder and the cameras of the camera dolly still being discernible. In this way, the requirements involved in the performance and recording the performance can be harmonized even better. In addition, any supply cables for transmitting video and/or audio signals of the respective camera, control data and/or position data can be arranged under the floor or over the ceiling. This makes it possible to avoid tripping hazards and resultant injuries and/or technical malfunctions.

Additional advantageous configurations, details, aspects and features of the present invention may be recognized from the dependent claims, the specification and the attached drawings.

The term "flat body" as used herein is intended to describe a body that has an extension in at least one direction, typically in two directions orthogonal to one another, that is larger than in a direction substantially perpendicular thereto by a factor of at least 3, typically of at least 5. The term "camera" as used herein is intended to encompass both a film or video camera, in particular an at least full-HD capable film or video camera, along with a combination of a film or video camera and an additional optical attachment, e.g., a lens system, as well as an integrated system comprised of the film or video camera and additional optical attachment.

FIG. 1A presents a schematic side view of a remote-controllable camera dolly 100. In the exemplary embodiment, the remote-controllable camera dolly 100 includes a flat first main body 10, with which eight first wheels 1 are joined (connected) by means of respective axes 4. The respective rotational axes (dashed-dotted arrows in FIG. 1A) of the first wheels 1 are substantially parallel to one another. However, only four of the eight first wheels 1 are visible on FIG. 1A, whose rotational axes lie in one plane, and which cover the other four first wheels. In other embodiments, four, six or even more than eight first wheels 1 are joined with the first main body 10. In addition, four second wheels 2 are joined with the first main body 10, of which only two are visible in FIG. 1A. The rotational axes of the second wheels 2 are arranged in a first plane 21, which is substantially orthogonal to the rotational axes of the first wheels 1, such that the camera dolly can be moved in a guided manner via the first wheels 1 and second wheels 2 along a guide element, typically on and along a rail system. In addition, the first main body 10 is detachably joined, e.g., by way of screw connections, with a motorized camera holder 30 that can pivot in at least two axes, in or on which a camera can be detachably fastened, or into which a camera is integrated. Since camera holders are known in the art, it was decided for reasons of clarity not to present a detailed illustration of the camera holder 30 in FIG. 1A.

The first main body 10 may have a substantially rectangular cross section, e.g. it may be a substantially flat cuboid, wherein corners or edges may be rounded. However, the first main body 10 can also consist of several flat partial bodies.

The first main body 10 typically extends between the two rows of first wheels 1, of which only one row is visible on FIG. 1A, until the second wheels 2. This is denoted in FIG. 1A by the dashed line 14. This structural design allows the center of gravity of the camera dolly 100 to be as low as possible, so that the stability of the camera dolly 100 can be increased when it is resting or traveling on rails with the second wheels 2. The first wheels 1 can serve as lateral guides. Depending on how the rails and first wheels 1 are dimensioned, the first main body 10 can extend between the two rows of first wheels 1 even as far as under the first wheels 1. The camera holder 30 can typically be detachably fastened both to, at and/or on an upper side 17 of the camera dolly 100, e.g., at the upper side 17 of the first main body 10, as well as to, at and/or under a lower side 18 of the camera dolly arranged opposite the upper side 17, e.g., to the lower side 18 of the first main body 10. This makes it possible to easily convert the camera dolly 100 from a first configuration, in which the camera is guided above the first main body 10, into a second configuration, in which the camera is guided below the first main body 10. The use of two or more camera dollies 100 in a respective one of the two configurations, and the ability to move them on rails erected at different heights, for example, makes it possible to combine recordings from widely disparate perspectives.

Figure 1B:
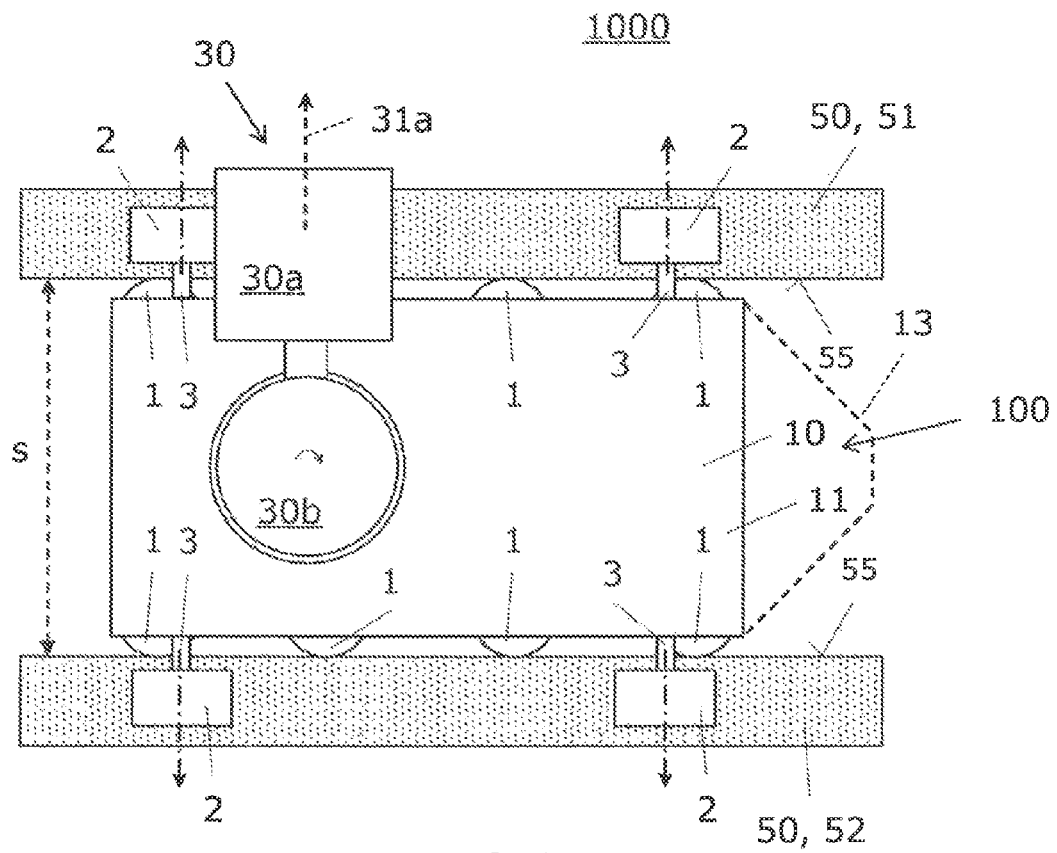
FIG. 1B is a top view of a system for television, film or video recordings, with a camera dolly according to an embodiment.

FIG. 1B presents a top view of a system 1000 for television, film or video recordings with the camera dolly 100, which rests with its second wheels 2 on a two-rail track 50 having a first rail 51 and a second rail 52, which are spaced a track width s apart from one another. For reasons of clarity, however, FIG. 1B shows only a small portion of the two-rail track 50. The rail system 50 may include one or more two-rail tracks 50, which each may have both straight and curved sections, and even be arranged at varying heights. One or several camera dollies 100 can be moved on each two-rail track 50, wherein the first rail 51 and the second rail 52 of the respective two-rail track 50 each includes an upper side (dotted surfaces in FIG. 1B) and an interior side 55, which are each substantially straight in a cross section or at least have straight sections. As a result, the respective camera dolly 100 can be placed onto the rail system 50 in such a way that the interior sides 55 of the first rail 51 and the second rail 52 are contacted by a respective half of the first wheels 1, and that the upper sides of the first rail 51 and the second rail 52 are contacted by a respective half of the second wheels 2.

The first rail 51 and second rail 52 can be sections having a substantially rectangular cross section, e.g., aluminum system sections. This enables a cost-effective structural design for the rail system 50.

The first rail 51 and second rail 52 are typically blackened, so that they are hardly discernible in the typically darkened recording environment. For example, the first rail 51 and second rail 52 can be correspondingly anodized sections.

For this reason, the visible surfaces of the first main body 10 and the camera holder 30 are also typically blackened, and at least the first wheels 1 are fitted with tires made out of a black material. However, black tires can also be provided for the second wheels 2.

The tires for the first and second wheels 1, 2 typically consist of a flexible plastic, such as PUR (polyurethane), making it possible to increase the stability, slip-resistance and smoothness of the camera dolly 100.

The first wheels 1 and second wheels 2 are typically designed as plane rollers. This enlarges the contact surface to the first and second rail 51, 52. This makes it possible to further increase the stability, slip resistance and smoothness of the camera dolly 100.

In addition, the second wheels 2 are damped, mounted over individual axes 3 or in pairs over a shared carrying axle 3. For example, the second wheels 2 can be mounted or suspended like truck wheels, correspondingly miniaturized.

In addition, the first wheels 1 can be resiliently mounted in a direction orthogonal to their respective rotational axis, i.e., in the direction of the rotational axes of the second wheels 2 denoted by a dot-dash arrow, such that the first wheels 1 resiliently arrange the camera dolly 100 between the first rail 51 and second rail 52. In this way, the stability, slip resistance and smoothness of the camera dolly 100 can be further increased. This also allows for quiet film or video recordings while the camera dolly 100 travels at typical speeds of up to about 4 m/s, even through curves with low curvature radii measuring down to below about 60 cm.

The track width s is typically less than 20 cm, even more typically less than 15 cm. In light of this fact, and given the typically small camera dollies 100 having a volume of the main body 10 typically measuring less than about 2 liters, even more typically less than about 1 liter, the system 1000 has practically no disruptive effect on a live performance or its recording.

In addition, the rail system 50 can be secured under a floor and/or over the ceiling of a stage or studio in such a way that the camera holder 30 extends at least partially through a slit in the floor or ceiling if the camera dolly 100 is placed on the rail system 50. As a result, the rail system 50, any supply cables and most of the camera dolly 100 can be accommodated outside of the actual stage, studio or auditorium.

In order to drive the camera dolly 100, the first main body 10 typically incorporates an electric motor and, if needed, a reduction gear connected with the electric motor. It was surprisingly discovered that the camera dolly 100 can be moved on the two-rail track 50 with a high reproducibility and smoothness using just a single driven second wheel 2. In this embodiment, a planetary gear can be placed between the electric motor and the driven second wheel 2 instead of the otherwise typically used differential gear, or a gear can even be completely eliminated.

In an embodiment, the first main body 10 incorporates a power source, e.g., a battery, which can be used to supply power to the electric motor and camera holder 30, as well as to other modules or components, e.g., a sensor and/or transmitter for determining a position of the camera dolly 100.

For example, the determination of the position of the camera dolly 100 can be laser, radio or ultrasound-based. In these embodiments, the camera dolly 100 can have corresponding transmitters, sensors or signal reflectors. If the two-rail track 50 is straight, the position of the camera dolly 100 can be determined by measuring the distance from a fixed point, which can be located at one end of the two-rail track. This is often also the case when at least sections of the two-rail tracks 50 are curved, in particular when the position of the camera dolly 100 is routinely determined and/or at least the approximate position of the camera dolly 100 can be ascertained from motor data. The camera dolly 100 may also have a sensor for detecting position marks on the two-rail track 50.

As an alternative to using an internal power source, the camera dolly 100 can also be supplied with electrical power by way of a supply cable. A connection for the supply cable can be located on the side of the first main body 10 or on the upper side of the first main body 10, so that the camera dolly 100 can drag along the supply cable to the side next to the two-rail track 50.

In the supply cable electrical and/or optical data lines for transmitting video signals, control data and/or position data may be integrated. However, the supply cable may also be a pure data cable for transmitting video signals, control data and/or position data.

However, at least portions of the video signals, control data and/or position data may also be transmitted by a radio module of the camera dolly.

The modules may be fastened onto or under the main body 10 by means of corresponding mounting holes.

In the exemplary embodiment, the camera holder 30 can be pivoted in two axes. The camera may be fastened to a receiving unit 30*a* of the camera holder 30 mounted so that it can turn around an axis 31*a* relative to a rotating module 30*b*. The rotational axis of the rotating module 30 is here substantially perpendicular to the first plane.

The camera dolly 100 is typically constructed so as to have the lowest possible center of gravity, e.g., below the second wheels 2. To this end, a weight plate arranged below the first plane or even below the second wheels 2 may be provided in or on the first main body 10.

In the exemplary embodiment shown in FIG. 1B, the first main body 10 is substantially rectangular when viewed from above. In other embodiments, the first main body 10 tapers, at least when viewed from above. This is indicated by the dashed line 13 in FIG. 1B, and facilitates a two- or multi-part construction of the camera dolly, typically out of similarly designed camera dolly sections. As a result, versatility can be increased, and the camera dolly can be built especially small, and also be guided around very tight curves.

The camera dolly 100 can thus include a flat second main body that is joined with the first main body 10 so that it can pivot in its first plane. The second main body here includes at least four additional first wheels, which are joined with the second main body and whose respective rotational axes are arranged parallel to one another, and at least four additional second wheels, which are joined with the second main body and whose respective rotational axes are arranged in a plane substantially orthogonal to the rotational axes of the at least four additional first wheels.

In the joined state, the second main body typically projects partially into the first main body 10. In addition, the second main body is typically connectable or connected during operation with the first main body 10 by means of a short supply cable for supplying power and/or transmitting video signals, control data and/or position data. As a result, the modules or functional units can be split up among two or more camera dolly sections. In this way, only one of the main bodies or partial bodies may include an electric motor, while a battery is accommodated in another main body or partial body. However, several electric motors synchronized with one another and incorporated in different main bodies may also be used.

Figure 2:
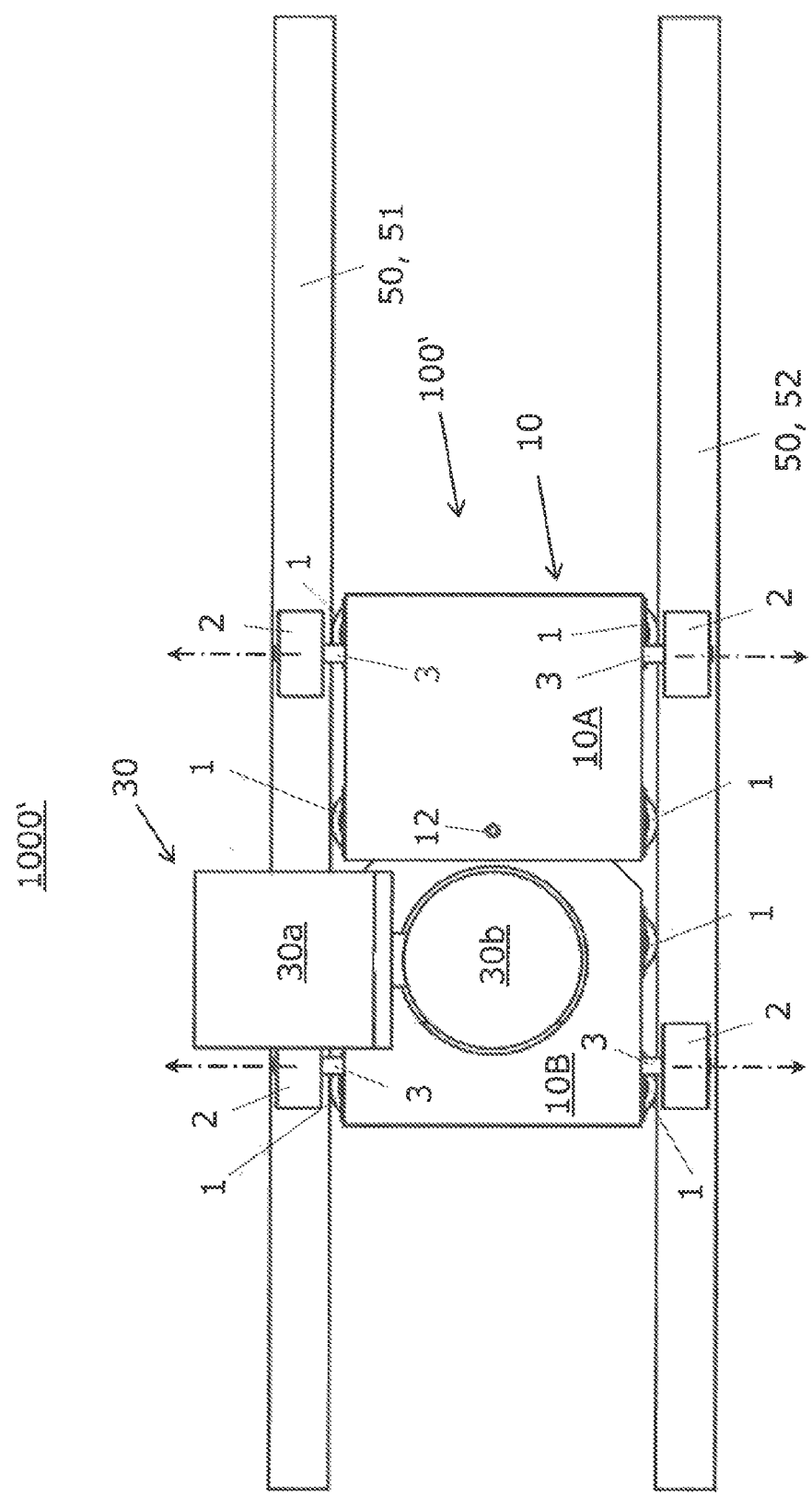
FIG. 2 is a top view of a system for television, film or video recordings with a camera dolly according to another embodiment.
Figure 3:
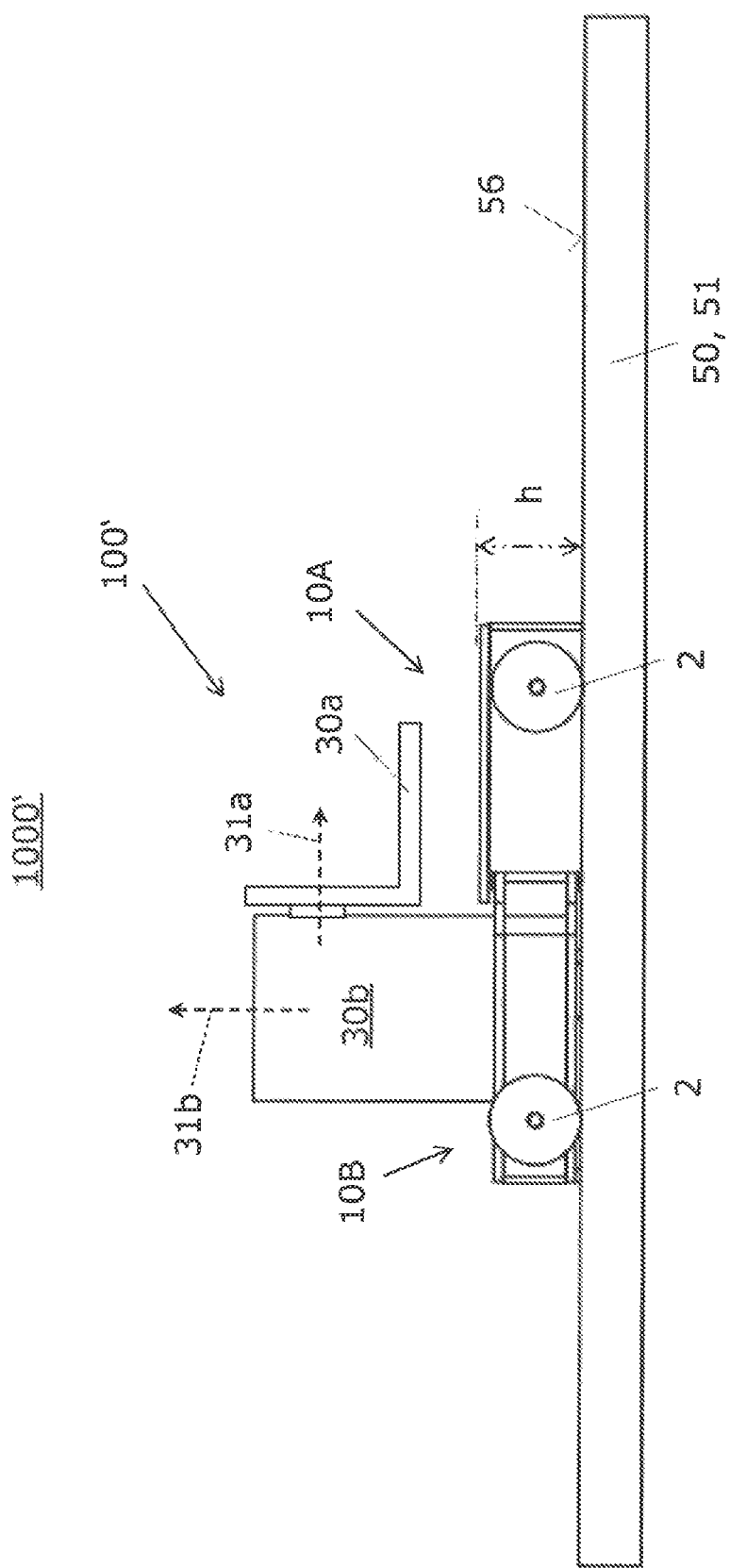
FIG. 3 is a side view of the system for television, film or video recordings shown on FIG. 2 according to another embodiment.

Described with reference to FIGS. 2 and 3 is a similar system 1000' for television, film or video recordings with a camera dolly 100' that is similar to the camera dolly 100 described with reference to FIGS. 1A, 1B and 2, but consists of two or more flat partial bodies 10A, 10B, which can be pivoted relative to one another in relation to a first plane defined by the rotational axes (dash-dot arrows on FIG. 2) of the second wheels 2. FIG. 2 is a top view, and FIG. 3 is a side view.

The two partial bodies 10A, 10B are typically joined together by means of a corresponding hinge 12, as well as a short supply cable (not shown) for supplying power and/or transmitting video signals, control data and/or position data.

Each of the flat partial bodies 10A, 10B typically includes at least two first wheels 1, e.g., four first wheels 1, and at least two second wheels 2. This allows the camera dolly 100' to move stably and quietly on the rail system 50.

In addition, the second partial body 10B typically projects partially into the first partial body 10A. This enables a very compact design of the camera dolly 100', and that the modules or functional units can be split among two or more camera dolly sections.

In the side view presented in FIG. 3, the camera holder 30 is turned clockwise by 90° around the rotational axis 31*b* of the rotating module 30b by comparison with FIG. 2. In addition, FIG. 3 shows that the partial bodies 10A, 10B or the main bodies can be made of simple plates. Alternatively thereto, the partial bodies 10A, 10B or main bodies can consist at least partially of a milled base body.

The first main body 10, 10A, 10B typically only extends up to a height h of at most 7 cm over the upper side 56 of the first rail 51 and second rail 52. This makes the camera dolly less visible, and increases its stability on the rail system 50.

In addition, the center of gravity of the placed camera dolly typically lies under the upper sides 56 of the first rail 51 and second rail 52, which increases the stability of the camera dolly on the rail system 50.

The camera that can be accommodated by the camera holder 30 typically has a volume of at most 0.25 liters.

In order to satisfy the requirements of professional recording systems, the camera can typically deliver video signals with a data rate of more than 100 Mbit/s, even more typically of more than 1 GBit/s. A professional, even digital, film camera may be used. However, the camera may also be provided by a mobile phone, which can be detachably secured on or in a correspondingly designed camera holder 30.

The video data along with the position data of the camera dolly/dollies may be fed into a console and/or a control computer for controlling the position of the at least one camera dolly, an orientation of the camera holder and/or a camera setting, e.g., via respective data cables or wirelessly, and displayed on a monitor.

The use of a control computer makes it possible to provide a programmable system 1000, 1000' for television, film or video recordings, in particular a synchronous, multi-camera system. Several camera dollies may be program-controlled in such a way as to synchronize their movements relative to each other.

For example, the control computer can be or include a touchscreen programming device, on which all camera dolly and camera movements along with other settings can be programmed using a simple graphic user interface.

The movements can here be controlled based on time and/or event (e.g., upon reaching a position). It can also be provided that the movement and setting instructions are prioritized and stored, making it possible to combine different rules for the same camera.

The control computer typically has an import/export interface, so that movement profiles that have been traversed (driven) and remain to be traversed can be changed using conventional PC's.

This makes it possible to provide a so-called motion control functionality. For example, sequences and movements can in this way be prepared prior to the actual production, and then be tailored in detail on site as needed. With regard to onstage events that follow a fixed and rigid production schedule, e.g., classic orchestra concerts featuring a musical score and opera performances, this means that all camera dolly and camera movements can already be input in advance. Owing to the high resolution and reproduction accuracy, the motion control functionality also enables special trick shot recordings for films, advertisement and animation.

In addition, the movement data exported after shooting is complete can be further processed during postproduction in 3D programs.

Since the fully automated system 1000, 1000' can control several camera dollies equipped with cameras, only one operator is needed. By comparison to systems with one operator per camera, this allows a correspondingly high cost savings, given a constant number of cameras and perspectives.

The invention claimed is:

1. A remote-controllable camera dolly, comprising:
   a flat first main body;
   at least four first wheels which are connected with the first main body, and whose respective rotational axes are arranged parallel to one another;
   at least four second wheels which are connected with the first main body, and whose rotational axes are arranged in a first plane that is substantially orthogonal to the rotational axes of the at least four first wheels, such that the camera dolly can be moved and guided along a guide element by the at least four first wheels and the at least four second wheels;
   a motorized camera holder which is detachably connected with the first main body, and is pivotably about at least two axes; and
   an upper side to which the camera holder can be fastened, and a lower side which is arranged opposite the upper side and to which the camera holder can be fastened.

2. The camera dolly according to claim 1, wherein a volume of the main body is less than 2 liters.

3. The camera dolly according to claim 1, wherein the main body comprises several mounting holes.

4. The camera dolly according to claim 1, wherein the at least four first wheels or the at least four second wheels are implemented as plane rollers.

5. The camera dolly according to claim 1, wherein the at least four first wheels are resiliently mounted in a direction orthogonal to their respective rotational axis, and/or wherein the at least four second wheels are damped individually or in pairs using a respective carrying axle.

6. The camera dolly according to claim 1, further comprising:
   a weight plate arranged in the first main body below the first plane;
   an electric motor arranged in the first main body for driving at least one of the at least four second wheels;
   a reduction gear arranged in the first main body and connected with the electric motor; and
   a power source arranged in the first main body for supplying the electric motor and/or the camera holder.

7. The camera dolly according to claim 1, further comprising a connector for a supply cable for transmitting video and audio signals of the camera, control data and/or position data, or a wireless transmission system for transferring video and audio signals of the camera, control data or position data.

8. The camera dolly according to claim 1, further comprising a sensor and a transmitter for determining a position of the camera dolly.

9. The camera dolly according to claim 1, wherein a surface of the first main body or a surface of the camera holder is blackened, and wherein the at least four first wheels or the at least four second wheels have tires made of a black, flexible material.

10. The camera dolly according to claim 1, wherein the first main body consists of at least two flat partial bodies, which can be pivoted relative to one another in the first plane, wherein each of the at least two flat partial bodies is connected with at least two first wheels and at least two second wheels, and/or wherein the camera dolly further comprises the following:
    a flat second main body which is pivotably connectable with the first main body;

at least four additional first wheels, which are connected with the second main body and whose respective rotational axes are arranged parallel to one another; and at least four additional second wheels which are connected with the second main body and whose respective rotational axes are arranged in a plane substantially orthogonal to the rotational axes of the at least four additional first wheels.

11. A system for television, film or video recordings, comprising:

a rail system comprising a first rail and a second rail, which are spaced a track width apart from one another, wherein the first rail and the second rail each comprises an upper side and an interior side, which each are substantially straight in a cross section; and at least one camera dolly comprising:

a flat first main body;

at least four first wheels which are connected with the first main body, and whose respective rotational axes are arranged parallel to one another;

at least four second wheels which are connected with the first main body, and whose rotational axes are arranged in a first plane that is substantially orthogonal to the rotational axes of the at least four first wheels, such that the cameral dolly can be moved and guided along a guide element by the at least four first wheels and the at least four second wheels; and a motorized camera holder which is detachably connected with the first main body, and is pivotable about at least two axes;

wherein the at least one camera dolly can be placed on the rail system in such a way that the interior side of the first rail and the interior side of the second rail are each contacted by at least two respective first wheels of the at least four first wheels, and that the upper side of the first rail and the upper side of the second rail are each contacted by at least two respective second wheels of the at least four second wheels;

wherein a center of gravity of the at least one cameral dolly lies below the upper side of the first rail and the upper side of the second rail when the at least one camera dolly is arranged on the rail system, and wherein the first main body extends up to at most 7 cm above the upper sides of the first rail and the second rail when the at least one camera dolly is arranged on the rail system.

12. The system according to claim 11, wherein the first rail and the second rail are sections with a substantially rectangular cross section.

13. The system according to claim 11, wherein the track width between the first rail and second rail is less than 20 cm.

14. The system according to claim 11, wherein the first rail and the second rail are blackened sections.

15. The system according to claim 11, further comprising a camera having a volume of at most 0.25 liters that can be held by the camera holder.

16. The system according to claim 11, wherein the camera can deliver video signals with a data rate of more than 100 Mbit/s and/or wherein the camera is provided by a mobile phone.

17. The system according to claim 11, further comprising:

a positioning system for determining a position of the at least one camera dolly;

a console for controlling the position of the at least one camera dolly, an orientation of the camera holder and a camera setting;

a control computer for controlling the position of the at least one camera dolly, an orientation of the camera holder and/or a camera setting; and a monitor for displaying at least one camera image.

\* \* \* \* \*